Nov. 10, 1925.

F. D. JONES

EDUCATIONAL DEVICE

Filed March 25, 1922

1,560,994

Inventor:
Frederick D. Jones.
per Oliver S. Farnum
Attorney.

Patented Nov. 10, 1925.

1,560,994

UNITED STATES PATENT OFFICE.

FREDERICK D. JONES, OF ALHAMBRA, CALIFORNIA.

EDUCATIONAL DEVICE.

Application filed March 25, 1922. Serial No. 546,837.

*To all whom it may concern:*

Be it known that I, FREDERICK D. JONES, a citizen of the United States, and a resident of the city of Alhambra, county of Los Angeles, and State of California, have invented novel and useful Educational Devices, of which the following is a specification.

My invention relates to the art of education and has for its objects to provide a light, cheap, compact and durable index device comprising a series of receptacles or card spaces adapted to receive printed drill cards for the use of pupils of the lower grades in public and private schools and elsewhere; wherein such cards may be retained in compact and orderly manner; may be removed or replaced readily; and having graphically displayed thereon letters, figures, words, pictures or other characters of an educational nature, all designed to assist the pupil in spelling drills, word building, counting, addition, sentence and story building and the like.

I attain these objects by means of a novel and useful provision, formation and combination of parts to form a partitioned indexed container adapted to receive educational drill cards, said container or index device presenting in graphic form educational features and elements thereon, as shown in the accompanying drawings, in which—

It will be apparent that other graphic characters may be displayed on the device, as words or pictures, for educational drills therewith.

Referring more particularly to the drawings, an oblong rectangular body, 1, preferably of wood, is provided with transverse saw-cuts or spaced depressions, 3, throughout its length and for a part of its depth; and sides, preferably of cardboard, (2), attached to said body to form a series of receptacles or card spaces open at the top only.

Figure 1:
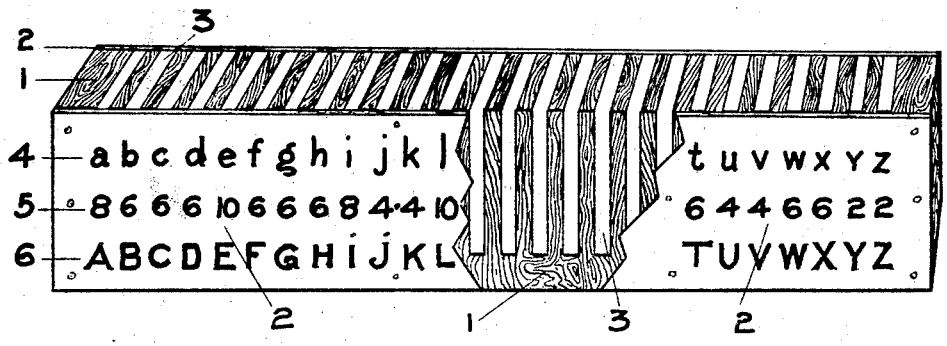
Figure 1 is a perspective of the device partitioned for twenty-six receptacles and graphically displaying letters of the alphabet and a series of figures for specific educational purposes.

One side, (Figure 1,) is provided with three rows of characters graphically displayed thereon, an upper row, 4, comprising the small or "lower case" letters of the alphabet, each letter placed to indicate its respective receptacle alphabetically arranged; a lower row, 6, graphically displaying the capital or "upper case" letters of the alphabet similarly placed; and a center row, 5, comprising a series of figures indicating the number of the respective lettered cards normally to be found in the designated receptacle.

Figure 2:
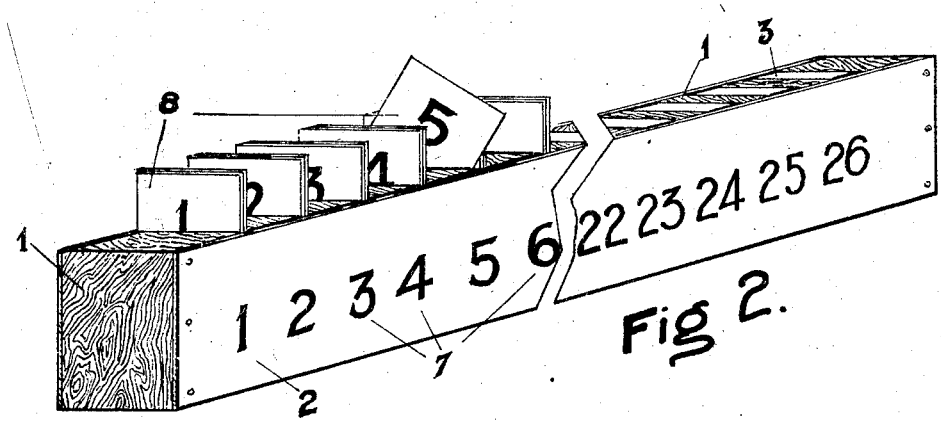
Figure 2 is a broken perspective of the reverse side of the device graphically displaying a series of figures to indicate the contents of the several receptacles, together with educational drill cards therein.

The reverse side (Figure 2), is provided with a row of figures or numbers, 7, graphically displayed thereon, each placed to designate its respective receptacle, consecutively arranged. Cards, 8, bearing printed characters corresponding with those graphically displayed on the side of the device, are provided in combination for the drill desired for the pupil.

It will be apparent that for sentence and story-building drills the device would display words or pictures instead of letters and figures shown in the drawings, the words to be indexed by their initial letters and pictures by the initial letters of their several descriptive words, all to correspond with the words or pictures printed on the educational drill cards.

I claim—

In combination with educational drill cards bearing letters printed thereon, an oblong, rectangular body, of wood, and provided with relatively narrow transverse saw cuts therein spaced to leave standing partitions separating the same, adapted to form receptacles to receive said cards; said body being provided with sides of suitable material to close the ends of said saw-cuts, and having printed thereon opposite each of said receptacles letters corresponding to the letters on said cards normally contained within said receptacles; and numerals printed on said sides to indicate the number of each of said printed cards normally contained in each receptacle.

In testimony whereof, I have signed my name to this application.

FREDERICK D. JONES.